Feb. 15, 1949.    W. W. BOWMAN    2,462,019
BEVERAGE DISPENSER
Filed Jan. 15, 1942    5 Sheets-Sheet 1

Fig. 1

INVENTOR
W. W. Bowman
BY
Morgan Finnegan Durham
ATTORNEYS

Feb. 15, 1949.　　　　W. W. BOWMAN　　　　2,462,019
BEVERAGE DISPENSER
Filed Jan. 15, 1942　　　　　　　　　　　　5 Sheets-Sheet 2

Fig. 2

INVENTOR
W. W. Bowman
BY
Morgan, Finnegan & Durham
ATTORNEYS

Feb. 15, 1949.   W. W. BOWMAN   2,462,019
BEVERAGE DISPENSER
Filed Jan. 15, 1942   5 Sheets-Sheet 4

INVENTOR
W. W. Bowman
BY
Morgan, Finnegan + Durham
ATTORNEYS

Patented Feb. 15, 1949

2,462,019

UNITED STATES PATENT OFFICE 2,462,019

BEVERAGE DISPENSER

Wade W. Bowman, New York, N. Y.

Application January 15, 1942, Serial No. 426,822

10 Claims. (Cl. 225—26)

The invention relates to novel and useful beverage dispensing mechanisms.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Fig. 6 is an enlarged detail of one form of beverage delivery means provided by my invention, certain parts thereof being shown in horizontal section and others in top plan;

Fig. 7 is a central vertical section on line 7—7 of Fig. 6;

Fig. 7—A is a smaller view, similar to Fig. 7 of a modified form of nozzle chilling device.

Fig. 8 is a view, similar to Fig. 6, of a modified form of liquid dispensing means;

Fig. 9 is a vertical section, with parts in elevation, of a modified form of dispensing valve;

Fig. 10 is a transverse section on line 16—16 of Fig. 9;

Fig. 11 is a vertical section on line 17—17 of Fig. 9;

Fig. 12 is a rear elevation, with parts broken away, of a modified selecting switching mechanism;

Fig. 13 is a side elevation, viewed from the right, with parts in section, of the switching mechanism shown in Fig. 12;

Fig. 14 is a horizontal section on line 20—20 of Fig. 13;

Fig. 15 is an enlarged fragmentary detail, in section, of a selector push button; and Fig. 16 is a circuit diagram showing the application of the modified switch construction of Figs. 12-15.

The invention is directed to providing improvements in beverage dispensing machines, particularly machines for carbonated beverages and especially those wherein a plurality of different beverages or flavors may be selected by the customer. My invention provides a selective multi-drink beverage machine of great mechanical simplicity and durability, capable of coin controlled operation, but embodying the optimum of selectivity and flexibility of choice as to the number of flavor mixtures and sub-mixtures obtainable by the operator. One novel aspect of the invention is the provision of electrical control means which reduce mechanical complexity while permitting the greatest possible flexibility and selectivity in operation.

One object of the invention is to provide novel and improved carbonating apparatus whereby it is possible to impregnate water with the maximum amount of carbon dioxide and to maintain the degree of carbonation constant regardless of the number and frequency of drinks dispensed. Also with my carbonating apparatus the wear and tear on the mechanism is reduced to a minimum and expenditure of power is very low. A novel and simple electrolytic control of the fluid supply to the carbonating apparatus is one of the novel features of the carbonating apparatus.

Another object of the invention is to provide new and improved controls for the supply and delivery of the various fluids used in mixing and dispensing beverages. More particularly I provide a novel system of electrical timing and selective valve control means whereby fluids under pressure may be selectively dispensed with maximum accuracy while permitting superior flexibility in varying the relative amounts of said fluids. This aspect of the invention also includes a novel system and means for feeding syrups or other flavoring means from their respective supply sources to the dispensing nozzle or nozzles.

Another object of the invention is to provide improved means for mixing and delivering the mixed beverages, avoiding foaming or frothing in the receiving vessel, preventing contamination of one flavor by another, and insuring maximum cleanliness and purity of flavor over prolonged periods of use.

The invention also provides novel means for maintaining low temperatures in the fluids to be dispensed up to the point of ultimate delivery so that the customer will receive a beverage which is chilled to the desired temperature and there will be no substantial variation in temperature between drinks. This feature of the invention also avoids the possibility of any of the fluids becoming warmed through remaining in the machine over long periods between dispensing operations, and serves to restore low-temperature after heat gains in transit from the main supply through conduits and valves to the delivery point.

Another object of the invention is to combine with novel features of flavor selectivity and electrical control of the dispensing apparatus, a basic user control by means of a coin or check-operated apparatus. This aspect of the invention also involves provision of several interlocking safety features whereby the machine or parts thereof will be rendered idle upon depletion of certain supplies of fluids or other materials.

Another object of the invention is the provision of novel means for registering and maintaining records of the numbers of drinks of each of the different flavors served by the machine.

Figure 1:
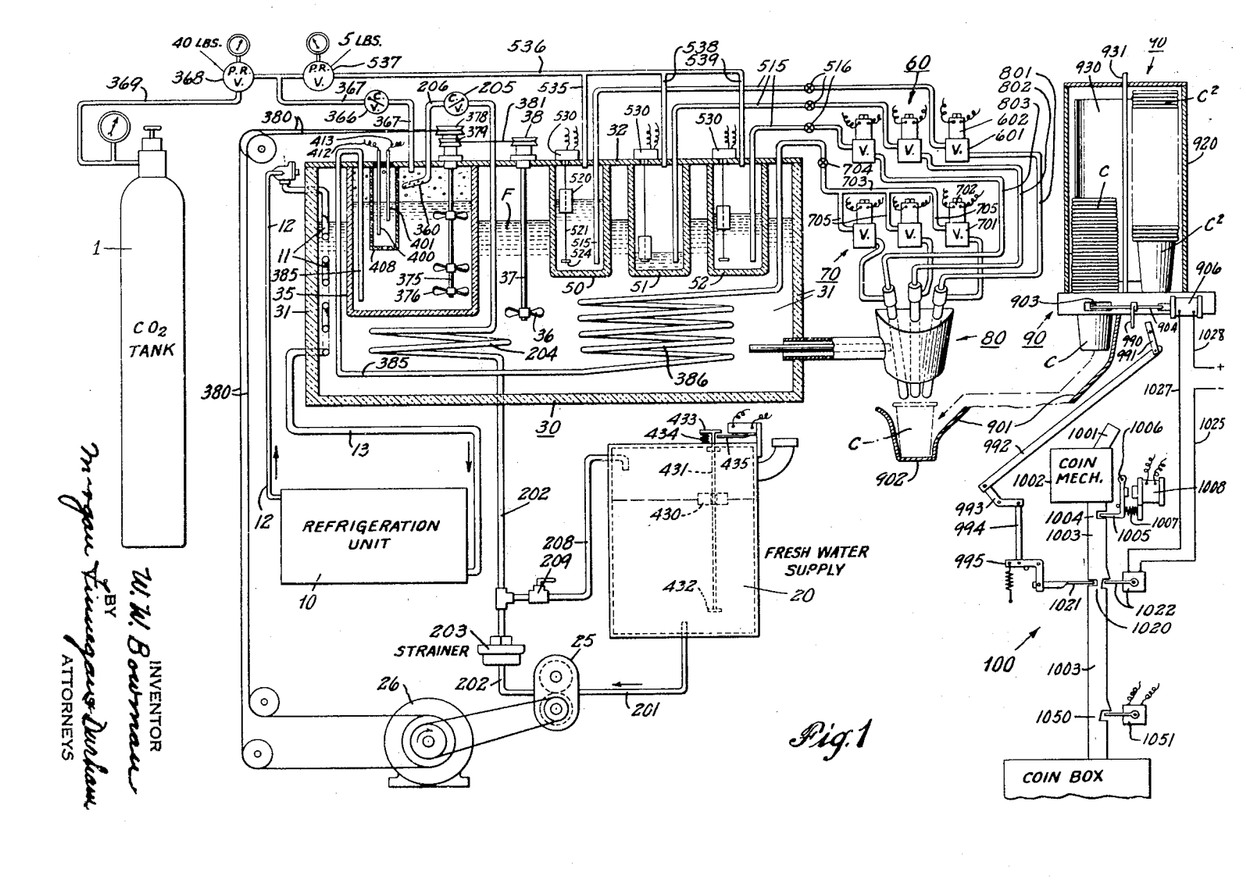
Fig. 1 is a diagrammatic showing of an apparatus embodying my invention, the various parts being shown substantially in their mechanical forms, some in elevation and some in vertical section, but said parts being arranged as in an expanded flow diagram rather than in their actual positions in the apparatus.

It will be understood that the foregoing general description and the following detailed description as well are exemplary and explanatory but are not restrictive of the invention. Referring now in detail to the present preferred embodiment of the invention illustrated by way of example in the accompanying drawings, Fig. 1 shows the several units of a beverage dispensing apparatus embodying my invention. As shown said units are arranged to illustrate their functional relationships, but in practice they are mounted within an appropriate cabinet which may be of any suitable type commonly known and used for dispensing beverages into paper cups by means of coin-controlled devices. The particular constructions of such cabinets and the arrangement of the several operating units therein constitutes no necessary part of the invention except insofar as the small size and efficiency of the several novel operating units make for convenience of relative arrangement and saving of space when suitably mounted within such a cabinet.

In general the units comprising the complete apparatus consist of a conventional supply for carbon dioxide shown as the pressure tank 1; a conventional refrigeration unit 10 which may comprise any suitable power-operated refrigerating mechanism; a fresh water supply tank 20 having a motor-driven pump unit 25 connected therewith; a water-refrigerating and carbonating unit comprising the tanks 30 and 35; the syrup or flavor supply unit comprising a plurality of syrup tanks 50 conveniently mounted within the chilling tank 30; the beverage mixing and delivery unit comprising sets of electrically operated valves 60 and 70 and the chilled delivery nozzle unit 80; the cup supply and dispensing unit 90; and the coin-controlled selective and sequence-determining unit generally indicated at 100 in Fig. 1. Said latter unit may also be considered to comprise the battery of push button control devices 110 (Fig. 2) and associated therewith the drink totalizing and registering unit 120. In the following description I shall sequentially describe the detailed construction and functioning of the several units comprising novel features of my invention and thereafter describe the mechanisms and operations which coordinate said units to operate in the apparatus as a whole.

Water carbonating unit

Figure 3:
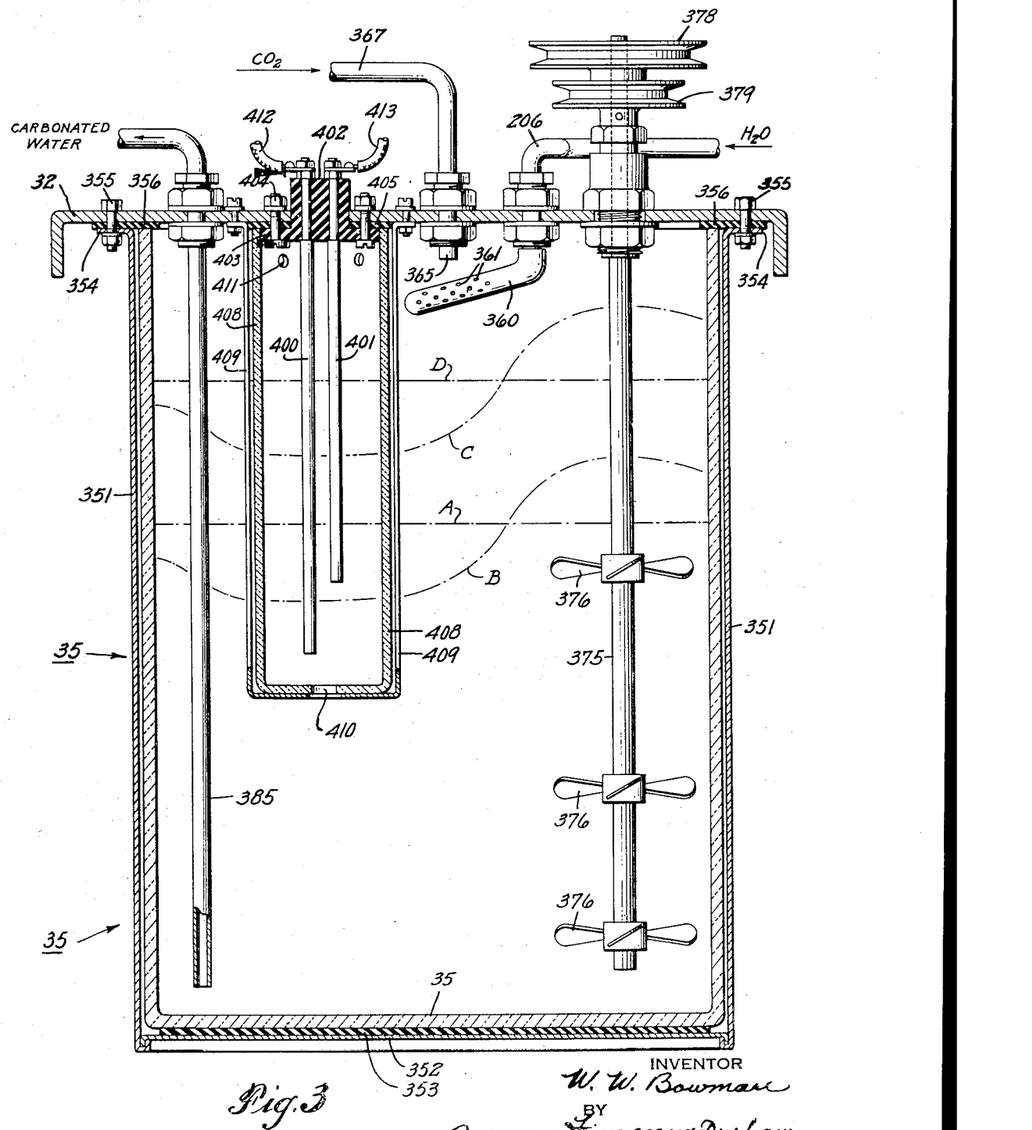
Fig. 3 is a vertical section, with parts in elevation, comprising an enlarged view of the carbonating apparatus.

The description of this unit, which comprises no part of the invention claimed in this application, includes the detailed mechanism shown in Fig. 3 and the coordination therewith of the carbon dioxide unit 1, the refrigeration unit 10 and the water supply and pump units 20 and 25. As embodied the water chilling tank is preferably rectangular in shape, being provided with a bottom, end and side walls 31 and a top closure 32. Said tank is preferably filled to near the top with a chilling fluid F which may be plain water or other suitable fluid. A suitable chilling coil 11 is provided in the tank 30 for the circulation of refrigerant from the refrigerating unit 10 to which it is connected by an inflow pipe 12 and an outflow pipe 13. Although said coil is shown diagrammatically in one portion only of the tank, in practice it preferably covers both sides and the bottom thereof. The particular means for operating the refrigeration unit and the circulation of refrigerant therefrom and through the coil 11 may be of any conventional construction, constitutes no essential part of the present invention and is therefore not shown in detail. Means may be provided for circulating the chilling fluid within the tank 30 so as to distribute same fairly uniformly throughout the body of the tank and as embodied said means comprise a circulating device having one or more sets of rotary vanes 36 on the vertical shaft 37 which depends from the top of the tank 32 and is driven from a pulley 38 by suitable connections from the pump motor 26.

The carbonation of water is performed within the closed tank 35 which is preferably cylindrical in cross-section and is suspended from the top 32 of the tank 30. The construction shown conveniently permits removal of the carbonator tank as a unit from the chilling tank, thereby giving easy access to the syrup jars 50–52 within the chilling tank 30.

Means are provided for supplying chilled water to be carbonated to the interior of tank 35 (Fig. 1). As embodied a water supply pipe 201 leads to the gear pump 25. The outlet 202 from the pump passes through a suitable strainer 203 and thence into the chilling tank 30 where it may be provided with a plurality of coils 204 and thence through the top 32 of said tank to a suitable check valve 205. Thence the water tube 206 leads downwardly again through the top 32. Preferably a by-pass pipe 208 is provided for returning water from pipe 202 above the strainer to the supply tank 20 and a hand controlled valve 209 is positioned in said by-pass to regulate the amount of water so permitted to return to the supply tank. In this manner the amount of water supplied to the carbonating tank may be conveniently regulated.

It will be understood that the use of the by-pass construction, as shown, permits employment of a high capacity pump while regulating the input of fresh water therefrom so that a substantial amount of time is occupied in delivering the water into the carbonating chamber. Thus a too rapid inflow of water is avoided and ample time provided for its carbonation, while retaining the advantages of the strong and high capacity pump.

Means are provided for introducing the chilled water into the top of the tank in the form of a spray and for that purpose an elongated and inclined spraying head 360 is attached to the lower end of the pipe 206, said head being provided with a plurality of small openings 361 which spray the water laterally against the tank walls over a substantial space near the top of the tank 35.

Said spray of water is located in a space above that ever reached by the level of the liquid in the tank 35 and is designed to forcefully eject and spray the water in a locus where it will meet and co-mingle with the carbon dioxide gas which is introduced into the tank for the purpose of carbonation. The embodied means for so introducing the carbon dioxide gas comprises a downwardly disposed, open-ended pipe 365 just within the top 32 of the carbonating tank thereby providing a space full of gas above the top level of liquid in the tank. The gas conduit 365 communicates through a check valve 366 in the cover 32 and a pipe 367 to a pressure reducing valve 368 which is preferably set to deliver gas at a pressure of approximately 40 lbs. per sq. in. from the tank 1 via the conduit 369.

Means are provided for facilitating intermixture of gas and water by agitation within the tank 35 and as embodied said means comprises a vertically-disposed rotary shaft 375 (with vanes 376) depending from the top of the tank and extending nearly to the bottom thereof.

Means are provided for withdrawing the carbonated water from the body of liquid within the tank 35 and preferably from near the bottom thereof by means of an open-ended tube 385 which lies diametrically opposite to the shaft 375 and near the opposite wall of the tank 35. Said tube passes through the top 32 of tank 30 and thence downwardly again through said top but outside carbonating tank 35 and along the outside thereof through the chilling fluid F. A suitable coil 386 is provided in said conduit 385 within the chilling fluid and from said coil the conduit passes out through the top 32 of the tank at the opposite end for distribution of carbonated water as will be hereinafter described.

The invention provides means for preventing the supply of carbonated water in the tank 35 from falling below a desired predetermined level and for supplying make-up water to the tank to be carbonated as required. This feature of my invention avoids the use of any moving parts such as floats, levers or the like in the carbonating tank. It is exceedingly accurate and certain in its operation. It is likewise relatively inexpensive and simple in construction. As embodied I employ a control circuit in which the carbonated water acts as an electric conductor, the circuit being broken when the level of the carbonated water falls to a point where the flow of current through it is insufficient to maintain a closed circuit.

The position of the electrodes is such that when the carbonated water in tank 35 remains above a predetermined level A, the resistance of the electrolytic current path between the electrodes will be sufficiently low to permit passage of enough current to maintain energization of the relay 415 and thereby hold open the circuit for motor 26. However, when the water reaches level A, the relay 415 will become de-energized and thereby switch 416 will be closed, thus causing the water to flow into the tank through spray 360 and simultaneously initiating rotation of agitator shaft 375.

Referring now to the fresh water supply apparatus, I preferably provide means for breaking the electric circuits to all units of the mechanism, except the refrigeration unit, when the supply of fresh water in the tank 20 falls below a predetermined minimum level. As shown the water supply tank 20 is provided with a float 430 which is movably centered on a guide rod 431. The lower end of said rod is provided with a cross bar 432 against which the float comes to rest when the water level falls below that of the bar. The upper end of said rod 431 projects through a suitable opening in the top of the water tank and is provided with a top bar 433 which is normally urged upwardly from the tank by a light spring 434. The rod 431 is adapted to move downwardly against the spring under the weight of the float 430 when the water is insufficient to buoy it up and thereby to open the switch comprising the movable arm 435. Thus the depletion of water in the tank 20 opens the switch 435 and thereby breaks the current flowing to the main line conductor 40 and hence de-energizes all of the units of the machine except the refrigeration unit.

That unit is preferably maintained in operation at all times so as to keep the carbonated water and syrup supplies chilled, whereby renewed operation of the machine at any time will be possible without waiting for cooling of the supplies. The refrigeration unit, as shown, is directly connected to the main electrical line inside the water-control switch 435. A thermostat 440 is preferably provided in the tank 30 adjacent to the water tank 35 and said thermostat is set to control the operation of the refrigeration unit whereby the chilling fluid in tank 30 may be maintained at a desired temperature.

*Syrup supply unit*

Figure 4:
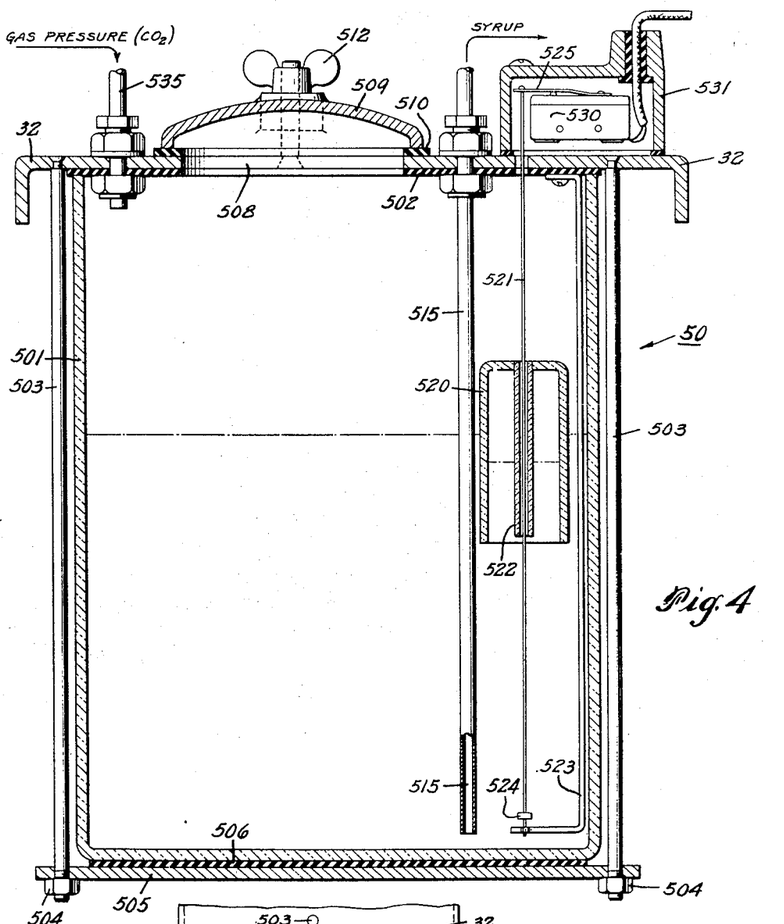
Fig. 4 is a similar enlarged vertical section of a syrup container.
Figure 5:
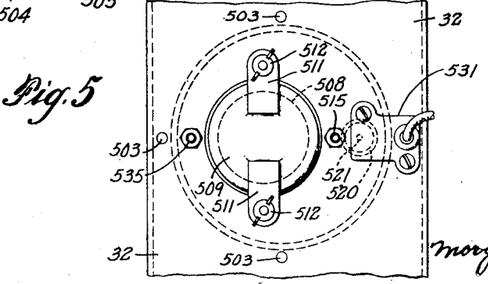
Fig. 5 is a top plan view of the apparatus shown in Fig. 4.

In accordance with the invention a plurality of different syrup flavors are provided for selective distribution and mixing in the beverage or beverages to be dispensed. I have shown three separate syrups or flavors comprising this unit of the invention, but it will be understood that many of the features of the invention will be applicable to use and dispensing of a single flavor and on the other hand the invention is not limited to any particular number of flavors. As shown the separate flavors are housed in individual containers 50 (e. g. for Coca Cola); 51 (e. g. lime syrup); and 52 (e. g. cherry syrup). Inasmuch as the mechanical construction of each syrup container is identical, that of container 50 only will be described in detail (Fig. 4). As embodied the container comprises a cylindrical jar 501 of glass or the like which is sealed at the top against the cover 32 of the tank 30, bearing against an annular rubber gasket 502 therebetween. The jar 501 is removably suspended from the top 32 by supporting rods 503 which are fixed in the top 32 and are threaded at their lower ends to receive nuts 504 for holding a jar-supporting bottom plate 505. A cushion 506 of rubber or the like is preferably fitted between the bottom plate 505 and the bottom of the jar 501.

The top plate 32 is preferably apertured at 508 to provide access to the top of the syrup container and a suitable cover 509 is sealed about the aperture by gasket 510 and clamping member 511 which are secured in place as by wing nuts 512.

Means for withdrawing syrup from the container 501 comprises a duct 515 which extends vertically downwardly from the top of the tank to near the bottom of the container. At its upper end the pipe 515 is suitably secured to and passes through the top 32 of the casing and thence turns for communication with its respective solenoid controlled valve as hereinafter described. A suitable hand-set valve 516 may be provided for individually regulating the flow in the pipe 515 and similar valves are provided for the other syrup ducts as shown.

Means are provided for preventing the withdrawal of syrup from a container when the level of syrup therein has sunk below a predetermined minimum. As embodied a float 520, comprising an inverted cylindrical cup, is mounted to slide vertically on a guide rod 521, the cup being provided with a central vertical aperture and guide tube 522. The lower end of guide rod 521 is supported by an L-shaped bracket 523 which depends from the top of the tank and runs along the side of the container 501. A stop bar 524 is positioned near the lower end of the guide rod 521 and normally is held a short distance above the bracket 523 by means of a leaf spring 525 which is connected to the top of rod 521 where it projects through top 32 of the casing. When the float reaches the lower part of the tank and the lower end of tube 522 comes in contact with the stop bar 524, the weight of the float will thereby depress rod 521 and with it the spring arm 525. The arm 525 constitutes the depressor member for opening a micro-switch 530 and thereby breaking the circuit connected with the selector mechanism for the particular flavor as will be hereinafter described. The micro-switch 530, as shown, is of the type which is normally closed and which is opened by downward movement of the depressor 525. A housing 531 for the switch is conveniently mounted to enclose same and the upper end of the actuator rod 521 on the top 32 of the tank.

In accordance with one feature of the invention pressure of carbon dioxide gas from the supply unit 1 is utilized to impel the syrup from its container 50 through its duct 515 to its respective control valve 60. As embodied, a constant pressure of carbon dioxide gas is maintained in the upper part of the syrup container 501, that is, between the top 32 and the level of the syrup in that container. For this purpose a gas conduit 535 is led into the top of the container through suitable union connections (Fig. 4). Said conduit connects with a main gas pipe 536 which is connected to the 40 lb. gas line 367 through pressure reducing valve 537 which reduces the gas pressure to a pressure in the neighborhood of 5 lbs. per sq. in., an amount adequate to maintain the desired feed pressure on the syrup in the tanks 50, 51, 52. It will be clear that gas conduits 538 and 539, similar to conduit 535, are provided for the individual syrup tanks 51 and 52 respectively.

*Beverage mixing and delivery unit*

This unit comprises the timer-regulated, solenoid-actuated measuring valves 60 for each of the syrup flavors; a set of similar valves 70 for the carbonated water to be furnished with each flavor; the triple flavor dispensing nozzle construction 80 and the chilling means associated therewith. Referring first to the nozzle construction and associated chilling means, same are shown in detail in Figs. 6 and 7. In accordance with the invention my mechanism is designed to provide completely independent delivery into the receiving cup of each of the three flavors illustratively shown, together with a draft of the appropriate amount of carbonated water. The arrangement of each delivery nozzle is such that its individual syrup or flavor is partly mixed with the draft of carbonated water while they flow together into the cup. One aspect of this feature of the invention is that the pressure on the carbonated water is partially relieved some distance from its point of delivery from the nozzle. This arrangement tends to reduce foaming of the drink in the cup because the carbonated water flows more gently into the cup than it would if the total pressure release were relatively near the cup. The arrangement also conduces to cleanliness in that the terminal part of the syrup tube is constantly bathed in a flow of carbonated water during the delivery operation and hence undesired flavor intermixtures from residual syrup at the nozzle and dripping of syrup into the cup before the drink delivery starts are eliminated.

Figures 6, 7, 7A, 8:
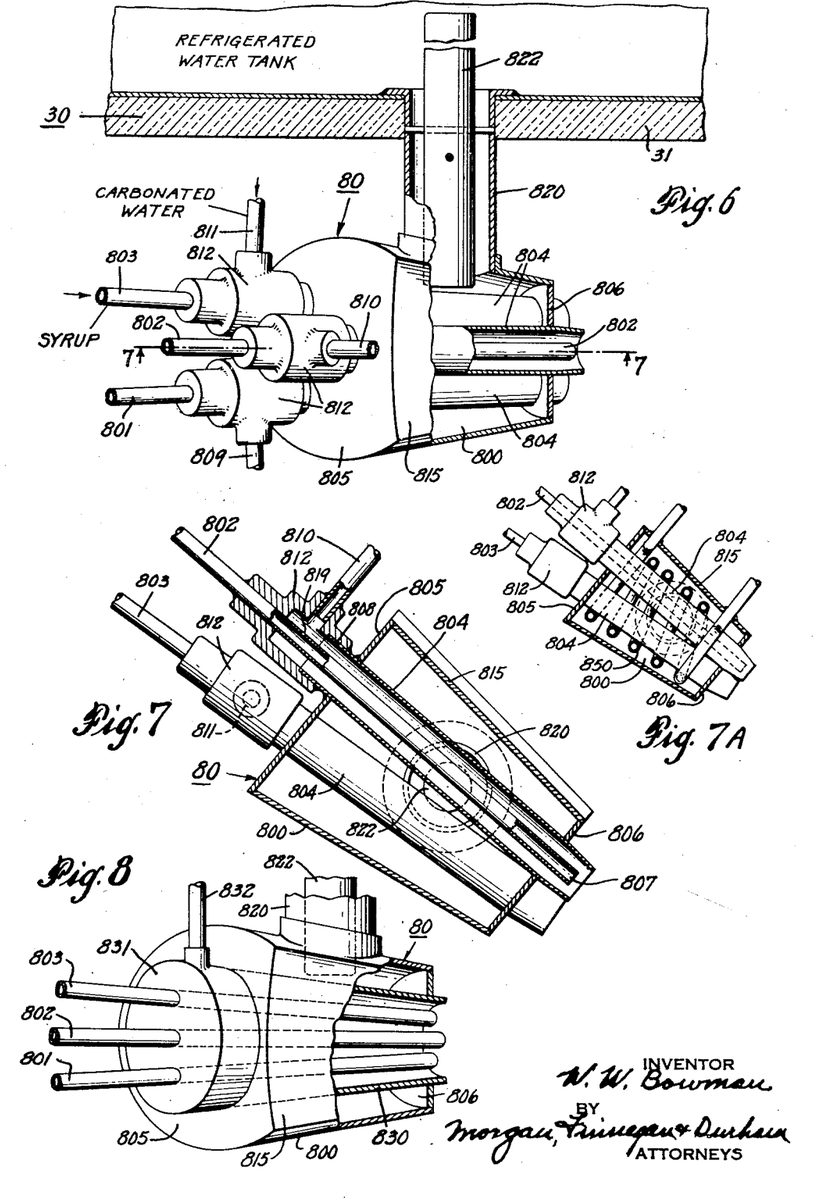

In the preferred embodiment of Figs. 6 and 7 the three syrup tubes 801, 802 and 803 each enter the housing 80 of the nozzle chilling device and converge to a closely clustered group at the lower end thereof. Syrup tube 802, for example, is surrounded by an outer sleeve or tube 804 which extends from the top plate 805 of the chilling housing 80 to beyond the bottom plate 806 thereof. Said sleeve 804 extends a substantial distance beyond the bottom 806 of the chilling housing and for a shorter distance beyond the bottom end 807 of the syrup tube 802. The upper end 808 of said sleeve 804 is seated in a T-shaped fitting 812, the opposite end of which is tightly sealed about the down-coming syrup tube 802. A tube 810 for carbonated water enters the fitting 812 at right angles to the syrup tube 802 and communicates with the considerably larger diameter sleeve 804 at a point just above the upper end of said sleeve. Thus carbonated water is brought into the enlarged space formed by the sleeve 804 at some distance from the point of ultimate delivery and thus travels about and along the syrup tube 802 to gush from the end of the sleeve 804 where it projects slightly beyond the delivery end 807 of the syrup tube. By this arrangement the ejected syrup is surrounded by a flow of carbonated water and is partially intermixed therewith before they reach the cup. As shown in Fig. 1 the cup C is positioned some distance below the ends of the water-syrup nozzles so that there is a distance of fall for the mixing liquids before they hit the bottom of the cup. As will be clear from Figs. 6 and 7 the construction of the other two syrup tubes 801 and 803 are identical with that of 802 in so far as the delivery portions thereof are concerned, each of said syrup tubes having its individual surrounding sleeve and carbonated water feed.

While the above-described construction is in itself highly effective for preventing excessive foaming or frothing in the cup, I have discovered a further means which very materially improves the anti-frothing action and also further facilitates maintaining cleanliness and flavor contamination. As embodied, I provide a relatively small opening 819 in the syrup tube 807 preferably just opposite the inlet of water tube 810 into the fitting 812. By this construction a relatively small amount of the carbonated water is introduced into the stream of syrup at a point remote from the delivery end of the syrup tube, thereby partially diluting and lubricating the flow of syrup through the tube. The higher head pressure on the carbonated water facilitates entry thereof into the syrup tube. This construction also overcomes the tendency of syrup to cling to the syrup tube and for drops of syrup to form and thicken at the end of the syrup tube.

The embodied means for maintaining the syrup and carbonated water chilled right up to the point of delivery into the cup is shown in Figs. 1 and 6. As embodied the chilling housing 80 for the water-syrup nozzles comprises a hollow chamber having the curved and tapered front wall 800, the flat ends 805 and 806 and the flat trapezoidal rear wall 815. Said chamber is adapted to be filled at all times with chilled liquid from the chilling tank 30 and as embodied a relatively large pipe or conduit 820 communicates through the wall 800 and at the other end into the chilling tank 30 through an end wall 31 thereof. Means for maintaining the lowest possible temperature in the housing 80 may be provided by a metal bar 822 which extends for a substantial distance into the chilling tank 30 and through the conduit 820 into the housing 80. Said bar should be of metal having high heat conductivity thereby facilitating heat exchange between the housing 80 and the chilling tank.

A modified form of chilling means for the dispensing nozzles is shown in Fig. 7—A. In this form the chilling housing 80 is directly chilled by a coil 850 formed in the refrigeration line 11—13. In this form the interior of the chilling housing 80 may be filled with chilling fluid from the refrigerating tank as previously described or, in many cases, the refrigerating coil 850 alone will be sufficient. In the event that liquid communication is provided with the refrigerating tank, it will ordinarily be unnecessary to provide the chilling conductor bar 822 because of the fact that the coil itself will provide adequate chilling action.

In Fig. 8 there is shown a somewhat modified construction for the delivery of carbonated water simultaneously with the syrup from any one of the inflow tubes 801, 802 or 803. As shown, these three syrup tubes are surrounded by a common water sleeve 830 which extends through the chilling housing and communicates at its upper end with a cap fitting 831. An inflow tube 832 is provided for introducing carbonated water into the fitting 831 at the upper end of the sleeve 830, thereby providing for a surrounding flow of carbonated water with the passage of syrup through any one of the three syrup tubes. With this modification it will be clear that only one solenoid valve 70 need be provided for the feed of the carbonated water and in such case the water conduit 703 will feed directly to such valve without any branch conduits. The modification of Fig. 8 is somewhat simpler in construction than that of Figs. 6 and 7, while possessing many of the advantages thereof. It will be understood that the form of chilling means shown in Fig. 7—A may also be used with the nozzle modification of Fig. 8.

As previously stated, a set of solenoid-operated time-control valves 60 are provided for individually regulating the amount of syrup fed to each of the syrup delivery nozzle tubes 801, 802 and 803. Said valves, comprising a conventional type of poppet valve 601, are of known construction and are therefore shown somewhat diagrammatically in Figs. 1 and 2. The movable part of said valve is provided with an upwardly extending stem (not shown) which comprises the core of a solenoid 602. Upon energization of the solenoid the valve stem is raised, thereby opening the valve and permitting flow of syrup through the tube 801 from the communicating syrup tube 515 out of container 50. Similar solenoid control valves are provided for each of the syrup supply conduits from the respective tanks 51 and 52. It will be clear that the quantity of liquid flowing through any such valve will depend directly upon the time the valve is open, the gas pressure in the feed tubes remaining constant as previously described.

In Figs. 9—11 there is shown a modified form of valve control mechanism adapted to be actuated by a solenoid, motor or other electrically controlled actuating mechanism located outside and apart from the valve mechanism itself. In this case the valve mechanism itself is shown in some detail and preferably comprises a generally conventional form made up of standard parts. The inlet pipe 515 of a syrup valve, for example, is joined to the upper end of a cylindrical valve chamber 610 by a suitable coupling 611. The interior of the chamber 610 is threaded to receive the upper exteriorly threaded end 612 of the lower valve chamber member 613. The upper end of member 612 is narrowed and suitably shaped at 615 to provide a valve seat for the reception of the cooperating upper end of the movable valve stem member 616. The stem 616 is reduced and threaded at its upper end 617 to receive a threaded cap 618. Between said cap and the valve seat 615 there is provided a sealing gasket 619 of rubber, fiber or other suitable material. The valve stem 616 is normally urged to closed position by means of a helical spring 620 which surrounds the lower portion of the stem within the enlarged chamber 621 of the lower member 613. The upper end of the spring bears against the top shoulder of the chamber 621 and at its lower end is seated on the enlarged bottom head 622 of the stem 616.

The outlet side of the valve chamber 613 communicates with the delivery tube 801 through an enlarged chamber 625 which is threaded at its upper end to receive the lower threaded end 626 of the member 613 and is threaded at its lower end to receive the threaded portion 627 of the coupling for the delivery tube 801.

Means are provided for imparting upward opening movement to the valve stem 616 from an electrically controlled device, such as the solenoid 630. It will be understood that other actuating means, preferably electrically controlled, such as a rotary electric motor and suitable linkage (not shown) may be provided instead of the solenoid 630. As shown the armature 631 of the solenoid is vertically movable upon energization thereof to depress the outwardly extending arm 632 of the valve lever to which it is pivotally connected at 633. The inner end 634 of said lever lies within the lower valve chamber 625 and is shaped to extend upwardly to bear against the bottom face of the valve stem head 622.

A sealed fulcrum or pivot point is provided for the lever 632—634 in the wall 636 of the chamber 625. As shown an exterior bracket plate 640 may be fastened to the outer face of said wall 636, both said wall and bracket plate being complementarily recessed to receive between them flexible gasket disc 641 of rubber or the like. A ball-shaped pivot 645 is formed in the lever 632—634 to rest in the central opening in the gasket, the walls 636 and 640 being suitably formed to house the ball member 645 as shown in Fig. 9. Thus a fluid-tight pivot is provided for the valve actuating lever whereby it may be operated from the externally operated solenoid. To prevent lateral movement of the lever 632 same is rectangular in cross-section up to the ball 645 and the conforming recess 646 in the wall bracket 640 is of similar cross-section, so as to prevent any sidewise or turning movement of the lever.

Each of the carbonated water delivery tubes 809, 810 and 811 communicates respectively with its own solenoid-operated time-control valve 701 which is similar in construction and operation to that of the valves 601 (or 610) previously described. Each of said water valves 701 has an in-feed pipe 705 which communicates with a main 703, forming the terminus of the carbonated water supply pipe 385 after same leaves the chilling tank 30. A suitable hand-set valve 704 may be provided in the pipe 703.

The cup supply and dispensing unit generally shown in Fig. 1 constitutes no necessary part of the invention claimed in this application. A more detailed disclosure thereof will be found in my co-pending divisional application, Serial No. 447,913, filed June 22, 1942, now Patent No. 2,374,168, dated April 24, 1945.

*Coin-controlled and electric-circuit sequence-determining and selection system*

I shall now describe the electrical control mechanism whereby the several units of my apparatus are coordinated and caused to function as desired by the operator and subject to his selective actions, said units also being subject to a basic check or coin control. Said coin control comprises a coin slot 1001 which communicates with a slug detecting and ejecting mechanism 1002. The latter is of any suitable or conventional construction and is shown diagrammatically. After passing through said slug ejector the good coin falls through a chute 1003 and is arrested at its first station 1004 by a trip finger 1005. Said finger is pivotally mounted from above at 1006 and normally held in coin arresting position by a compression spring 1007. Said finger 1005 is adapted to be retracted by energization of relay 1008 through closing of electric circuits as hereafter described. Upon energization of the relay the trip finger is temporarily withdrawn from the coin chute so that the coin falls to the next station as later described.

Selective operation of the apparatus for manual selection of the different flavors of beverage is provided by three manual push buttons 1100, 1101 and 1102 in the unit 110. Inasmuch as the construction of said push buttons is identical, a detailed description of one will suffice for all. As shown (Fig. 2) the three push buttons are housed in the unit casing 110. In the construction of push button 1100, the non-conducting or insulated parts thereof are shown in black. The push button construction 1100 comprises a rigid, fairly long rod 1105 which is of metal or other electrical conducting material, except as indicated. Said rod projects entirely through the casing 110 and is horizontally slidable therewithin for a limited distance. The rear end of the rod is provided with an upstanding portion 1106 to which is connected a tension spring 1107, the other end of which is fixed to the rear outer wall of casing 110 so as normally to urge the rod forwardly to its idle position. In that position the downwardly projecting stop 1108 bears against the rear wall of casing 110, said casing being apertured at 1109 to permit limited sliding movement of the rod therethrough.

Figure 2:
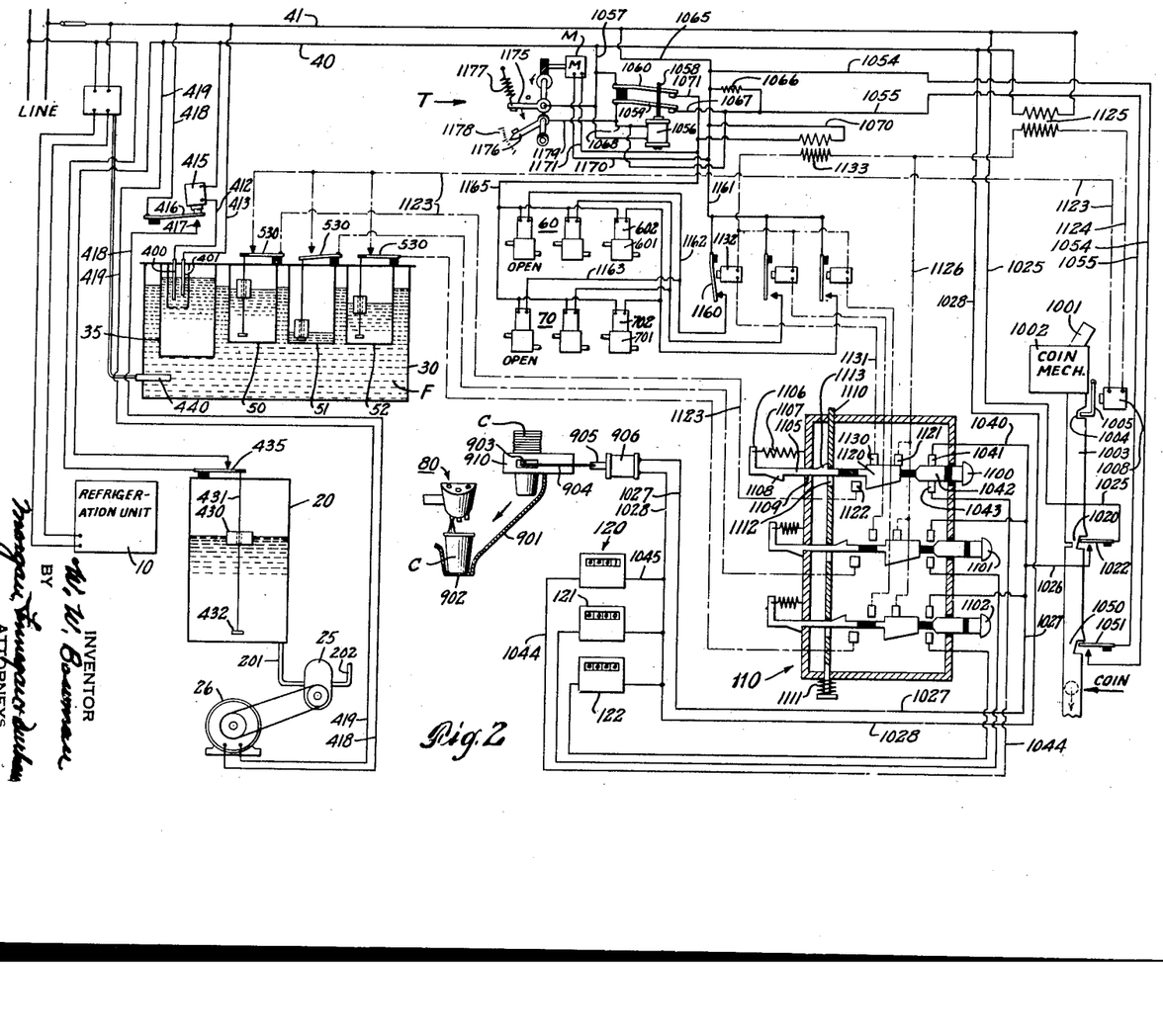
Fig. 2 is a diagram similar to that of Fig. 1 but showing the electrical devices and circuits provided for the operation of the apparatus shown in Fig. 1.

Return movement of the selected rod 1100 is prevented after same has been pushed in as shown in Fig. 2. For this purpose an interlocking plate 1110 is vertically disposed in the casing 110 near the rear wall thereof and said plate is normally urged downwardly by spring 1111 acting against its lower end outside the casing. Inward movement of rod 1100 through opening 1112 in the plate causes said plate to rise over the inclined surface of stop member 1113. When said stop member has traveled through the opening 1112, the plate falls and is thus in a position to block return movement of the rod by encountering the upright shoulder of the rod stop 1113. Hence the selected rod 1100 will remain in the position shown in Fig. 1 after it has once been pushed in as far as there shown. However, the subsequent pushing in of either of the other rods 1101 or 1102 will again raise the plate and thereby release the rod 1100 for return to its original position.

As will be clear from Fig. 2 the rod 1100 has an inward overthrow movement slightly beyond that indicated by its position in Fig. 2. The rod may be pushed in until its head 1100 bears against the front wall of the casing 110, that being the limit of its inward stroke on the initial push by the operator, but as soon as the operator's thumb is removed the rod 1100 will slide back to the intermediate station shown in Fig. 2.

Means are provided for energizing certain preliminary circuits upon the inward over-travel of the rod 1100, said circuits being interlocked with the supply of the selected flavor whereby the coin will be released from the first station 1004 in the event that there is an adequate supply of the selected flavor in its respective storage jar. As embodied, the trapezoidal contact member 1120 of the push rod 1100 is adapted to close a circuit by momentary contact between the brushes 1121 and 1122 when said push rod is at the limit of its inward stroke. Following the circuit lead 1123 from brush 1122 same goes through float switch 530 of syrup jar 50, thence through solenoid 1008. The return lead 1124 from said solenoid is connected to the secondary or low voltage coil of transformer 1125. The circuit then is completed through lead 1126 to brush 1121. It will be noted that this low voltage circuit and all others of like voltage are indicated by dot and dash lines to distinguish them from circuits of line voltage which is preferably in the neighborhood of 110 volts. The low voltage lines are preferably in the neighborhood of 10 volts.

The closing of the circuit just described causes a momentary energization of solenoid 1008, thereby withdrawing trip 1005 and permitting the coin to fall to the next station 1020. Said circuit is immediately broken by the return of rod 1100 from its overtravel position to that shown in Fig. 2. However, if no syrup of the selected flavor is left, the float switch 530 in that syrup jar will be standing open, hence the circuit is not closed and the coin is not permitted to fall from station 1004. This would be the case if push rod 1101 were operated, syrup jar 51 being in the depleted condition shown. In such case the operator may then select a different flavor whereupon the coin will be released for the further operations subsequently described.

With push rod 1100 in the position of Fig. 2, it conditions another low voltage circuit for closing a switch for the solenoid valves 60 and 70 of the selected flavor. As shown brush 1130 communicates with lead 1131 through relay 1132, transformer secondary 1133 and back to brush 1121 via shunt 1126. This circuit is dead, however, until the transformer is energized from the high voltage line as will presently appear.

At the second coin station 1020 in the chute 1003 there is provided a coin arresting bar 1021 and opposite it a switch arm 1022 adapted to be depressed by the weight of the coin. With switch 1022 thus closed current will flow from the main 41 through high voltage line 1025 across the switch 1022 via lead 1026 and its branch 1027 to solenoid 906 of the cup release mechanism. The return line 1028 from said solenoid goes direct to the main return line 40. Thus actuation of the cup release solenoid is effected by the coin at the second station 1020, thereby causing rod 904 to be retracted. Said rod is provided with a depending trigger 990 which is adapted to trip pivoted lever 991 which lies in its path. Said lever is connected by suitable linkage 992, 993, 994 to a spring-held bell crank 995 to which is connected the coin arresting bar 1021. Hence actuation of cup release rod 904 causes the coin to fall from its station 1020 and thereby reopens the circuit which had been closed by the presence of the coin at switch 1022.

Another branch of the circuit closed by switch 1022 is utilized to actuate the appropriate unit of the drink counting and registering mechanism 120. As embodied, a branch lead 1040 to brush 1041 completes a circuit through portion 1042 of push rod 1100 to brush 1043 and thence through lead 1044 to the counter-mechanism 120 which is diagrammatically shown. The circuit is completed through branch 1045 to return lead 1028. As shown, there are three such branch circuits for each of the counter units 120, 121 and 122, and that counter will be actuated which is connected with the first push rod to be selected by the operator.

A third station 1050 is provided in the coin chute whereby switch 1051 is actuated by the movement of the coin therepast before it comes to rest in the coin box. The temporary closing of switch 1051 by said movement of the coin closes a high voltage circuit for the timer unit T which circuit may be traced as follows: Lead 1054 connects main line 41 with switch 1051. Thence lead 1055 goes to solenoid 1056 to the timer relay, through the coil of said solenoid and returns to main line 40 via lead 1057. The projecting rod 1058 of said solenoid is connected to the pivoted arms 1059 and 1060 of a double pole switch in the timer.

Thus temporary energization of the solenoid by coin switch 1051 closes a holding circuit for the timer relay as follows: Lead 1065 goes from main line 41 through resistance 1066, along line 1055 to lead 1067. The latter connects with the brush 1059, through that switch and into the coil of solenoid 1056 via lead 1068 and then returns to main line 40 via lead 1057.

The closing of switch 1060 by the relay serves to energize a circuit for the primary coil of transformer 1133 as follows: Current flows over lead 1055, shunting resistance 1066 and through the transformer primary via lead 1070. From the primary, current flows via lead 1071 through switch 1060 and returns to the main as shown. Energization of the transformer sends current through relay 1132 and thereby serves to close a high voltage circuit switch 1160 which controls supply of current to the corresponding solenoids 602 and 702 for the syrup and water valves of the units 60 and 70. The timer mechanism is provided for permitting passage of current through said valves for a predetermined time period thereby to measure the amount of liquid supplied by them for the selected beverage. For this purpose the lead 1161 to switch 1160 communicates with syrup valve solenoid 602 through branch line 1162 and with water valve 702 through branch line 1163. The returns from these solenoids are via lead 1165 to switch 1060 over lead 1071.

A timing motor switch and circuits are provided for breaking the supply of current to the fluid-measuring valve solenoids after a predetermined lapse of time. As embodied, synchronous motor M is connected across the valve circuits by lead 1170 from lead 1161 and return lead 1171 to wire 1071. Thus the motor M is energized simultaneously with the closing of the valve solenoid circuit. A switch comprising angularly movable arms 1175 and 1176 is adapted to be closed by said motor. Through suitable gearing from the motor, arm 1175 is moved against the urge of spring 1177 to eventual contact with a switch point on arm 1176. The latter arm is stationary but may be pre-positioned to vary the timing to various points on the arcuate scale 1178. Switch arm 1176 is connected by lead 1179 to lead 1068, while switch arm 1175 connects to return lead 1057. Thus the closing of the motor-driven switch short circuits the solenoid 1056 of the timer relay and immediately breaks the circuits held by it which include those energizing the valve solenoids 602 and 702.

*Operation*

The operations of the respective units of my apparatus will be understandable from the description already given. However, I shall here describe the general operation of the apparatus as a whole and particularly the effect and influence of the operator-selective devices in determining the nature of the beverage finally dispensed.

I shall first refer to the operations involved in dispensing a beverage having a single flavor, such as Coca Cola, assuming that Coca Cola syrup is contained in the syrup jar 50. We shall assume that the push button controls are in the positions shown in Fig. 2. Push button 1100, having been used for the last previous drink, is therefore being held in the pushed-in or active position for closing the circuit to the timer transformer 1133. The operator then drops a coin in the chute 1001 and the coin falls to and is held at the station 1004. The operator is then free to select any one of the three flavors of drink desired because no final selection of flavor can be accomplished until one of the three push buttons has been pushed in to its "over-travel" position so as to close the circut for coin-release solenoid 1008. As the operator desires Coca Cola (the flavor of push button 1100) he must push in that button to its over-travel position and having done so the coin is released from station 1004 and falls to station 1020. At that station switch 1022 is closed, thereby effecting operation of the cup release mechanism causing a cup C to drop into the trough 902. Simultaneously the counter-mechanism 120 is actuated to register one drink of Coca Cola. The action of the cup release mechanism releases the coin from station 1020 and in falling it closes switch 1051 at station 1050.

As previously described the momentary closing of switch 1050 by the passage of the coin initiates the circuits which put the timer T into operation. As a result the holding relay 1132 is energized to close switch 1160 and thereby energize the circuits for the valve solenoids 602 and 702. That is, the solenoids 602 and 702 for the Coca Cola syrup flow valve and for the corresponding carbonated water flow valve are actuated. These valves are held open for a certain length of time and during that time the constant gas pressures force liquid through them in volumes predetermined by the settings previously made on the hand-set valves 516 and 704 and in accordance with the capacities of said valves themselves. Thus the length of time that the timer switch 1175, 1176, is held open determines very accurately the amount of liquid delivered by the syrup and water valves. Assuming that the time interval of said timer switch is four seconds for the exact filling of a cup C, the valve 602 for the Coca Cola syrup and valve 702 for the corresponding carbonated water supply will both stay open exactly four seconds and thereby the required mixture of those ingredients will be delivered to the cup C in exactly the required amount.

When the four seconds have elapsed, timer switch 1175, 1176 will close, switch 1160 will open and the solenoids 602 and 702 will instantaneously cut off further flow of liquids. During all these latter operations the push button 1100 will remain in the position shown in Fig. 2 and will so remain until the next drink is selected in the manner previously described.

I shall now describe an operation wherein a plurality of flavors may be mixed in a single drink. That is, with my apparatus it is possible to mix a carbonated water drink in which say three-fourths of the flavor is Coca Cola and the remaining one-fourth is lime flavor. Assuming that lime syrup is contained in jar 51, control of the actuating circuits for that flavor will be through push button 1101. Similarly push button 1102 will control the delivery of syrup from jar 52 which we shall assume contains cherry flavor. For producing the mixed Coca Cola and lime drink, the operator will, as before, deposit the coin and push button 1100 to its over-travel position, thereby starting the coin on its operative path as previously described. The operator will then watch the delivery of beverage into the cup until it has risen, say, to a level three-quarters full. He then immediately pushes in button 1101, i. e. the lime flavor button. That operation instantaneously and simultaneously disconnects push-rod 1100 by raising stop plate 1110, and sets rod 1101 in the position corresponding to that formerly occupied by 1100. By virtue of this shift of positions, the circuits controlled by rod 1101 are energized and those controlled by rod 1100 are cut out. Consequently, the valve controlling the flow of syrup from jar 50 is closed and simultaneously that controlling delivery of syrup from jar 51 is opened (this operation assumes that jar 51 contains sufficient syrup to keep its switch 530 closed). Simultaneously the respectively corresponding water valves 702 are closed and opened. Thus the flow of Coca Cola syrup is permitted for three-quarters of the timer cycle, while lime syrup flows for the remaining one-quarter of that cycle; that is, Coca Cola syrup flows for three seconds and lime syrup for one second, in the example given. Thus the operator will receive a full cup C containing a drink having three-quarters Coca Cola flavor and one-quarter lime flavor, but the total amount of liquid in the cup will be exactly the same as in the first example described.

In similar manner the operator may select for his next drink a mixture of Coca Cola and cherry flavor in the same proportion or any different proportion he desires simply by pushing in the button for the second flavor at the time when he wishes to make the flavor change. Likewise an operator may select and obtain a drink having all three flavors in any desired proportion by pushing each of the flavor buttons in sequence at appropriate times during the timer cycle for a single drink. He likewise may select a drink having any two of the three flavors in any proportions desired. He may change his mind while a drink is being dispensed and vary the proportions by switching back to the first flavor to add more of it than he originally intended. It will thus be clear that an infinite variety of selectivity is provided all within the range of liquid quantity contained in a single drink. Obviously my mechanism is adapted to the use of more than three flavors; it may be used with only two flavors; or, except for the elements of selectivity hereinbefore described, it is usable for a single flavor as well.

*Modified selective switch mechanism and circuits therefor*

A modified form of selective switch mechanism and the appropriate circuits for utilizing same are shown in Figs. 12 to 16. This modified switch mechanism is designed to perform substantially the same functions as that already shown and described in connection with Fig. 2 but has the advantage of providing a mechanically simpler and more rugged mechanism and one which is also less complicated electrically. It complies more readily with underwriters' requirements and also has the advantage of a relatively simple circuit system, all on the high voltage line and therefore requiring no transformers and secondary or low voltage circuits.

Referring first to the mechanical construction of the switching mechanism same is shown in Figs. 12-15. The mechanism there shown is intended as a substitute or modification for the triple push-button switch device shown with the casing 110 in Fig. 2. In the modification, three push-buttons 2001, 2002, 2003 are mounted in a vertical row, at the front of the machine cabinet, to project from a face plate 2004 of a switch housing or box 2005. The construction of one of said push-buttons is shown in detail in Fig. 15 and comprises the cup-like thumb piece 2001 which has cylindrical walls adapted to seat slidably within a supporting shell 2007. The shell is mounted by flanges 2008 on the front wall 2004 of the switch box and is recessed therewithin by extending through suitable circular aperture 2009 in the wall 2004. An axial plunger or rod 2010 is fixed at its outer end to the inner face of the button 2001 and extends centrally of the sleeve 2007 to project through an opening in the base thereof. The rod 2010 has an enlarged flange 2011 outside the base of the sleeve 2007 and beyond that terminates in a rounded nose 2012. A helical spring 2013 serves to maintain the rod and push-button in the normally retracted position shown in Fig. 15. Each of the push-button switches 2002 and 2003 is similarly constructed as will be clear from the drawings.

Each of the three push-button switches is adapted to function similarly to those of the unit 110 previously described for cyclic coin-controlled circuit operations. That is, each push button of Figs. 12-16 is adapted to have an extended or over-throw movement for closing the coin release circuit of solenoid 1008 for moving the coin from its first station 1004 (Fig. 16), thereby releasing the coin to energize the cup-dispensing and counting mechanisms through the corresponding switch at station 1020. The push-button switch also thereafter holds closed suitable circuits for the corresponding syrup and carbonated water valves so that same may function in conjunction with the timer T when the latter is energized by passage of the coin through the third station 1051. In addition, the switch mechanism is designed to provide in compact mechanical form a relatively simple and rugged interlocking system of levers whereby the various operations of selection and sub-selection of flavors may be effectively performed as hereinabove described under "Operation."

I shall first describe the construction and the operation of a single switch 2001. The nose 2012 of said switch is adapted to move against the overhanging end 2015 of a lever 2016 which is pivoted on a vertical shaft 2017 and thence extends across the switch box (to the left in Fig. 16) to overlie the extending end of a leaf spring actuator 2020 of a micro-switch 2021 as will be clear from Fig. 14. Pushing in of the button 2001 will thus depress the longer arm of lever 2016 and thereby close micro-switch 2021 through depression of the actuator spring 2020 against the underlying micro-switch button 2022. This construction and operation are diagrammatically shown in Fig. 16 and the parts are similarly numbered. Thus it will be seen that micro-switch 2021 directly serves to close a high voltage circuit for the syrup valve solenoid 602 and the corresponding water valve solenoid 702, said circuit being in series with the switches of the timer T previously described and with the coin operated switch 1051, all as previously described in detail in connection with Fig. 2.

Means are provided for holding the micro-switch 2021 closed by maintaining the switch lever 2016 in its depressed position (Fig. 14). For this purpose a latch is provided with a bail 2025 which extends vertically across within the switch housing and is pivotally trunnioned at 2026 and 2027 in the bottom and top wall brackets 2028 and 2029 respectively thereof. Said bail is provided with an outwardly inclined end 2030 and beyond that a curved shoulder 2031. A spring finger 2032 bears against the outer edge of the bail end 2030 and urges same toward the end 2038 of the lever 2016. The bail is provided at its center with a laterally projecting finger 2035 which engages an adjustable stop member 2036 which is threaded in the rear plate 2037 of the switch housing.

The end or nose 2038 of the switch arm 2016 is beveled to cooperate with the adjacent inclined face 2030 of the bail. Thus when said end of the lever 2016 is depressed by pushing in of the button 2001, it acts against the curved portion 2031 of the bail to push same against the spring 2032 and slide past same. When the arm 2016 has reached its depressed position and thereby actuated the micro-switch lever, the inclined face 2030 of the bail thereafter cooperates with the spring 2032 to hold the lever in said depressed position as shown in Fig. 14.

Also in accordance with the invention, means are provided whereby the over-throw or extra inward movement of the push-button 2001 causes energization of the coin release solenoid 1008 for the purpose hereinbefore described. For this purpose a micro-switch 2040 is adapted to cooperate with lever 2016 upon said extra or over-throw movement. As shown, a supplementary node or projection 2041 is provided on the outer face of lever 2016 nearer its axis 2017. Said node 2041 is adapted to actuate the push button 2042 of micro-switch 2040. Preferably an interponent plate 2043 is mounted on pivoted arms 2044 between the node 2041 and the switch button 2042 so as to transmit said motion as required.

The extra or over-throw movement imparted to lever 2016 for the purpose of actuating micro-switch 2043 is illustrated in Fig. 14. At the lower portion of said figure the over-throw movement of the switch rod 2010 is indicated between the normal switch closing position of lever 2016 (shown in full lines) and the slight further movement thereof indicated by the dot-and-dash line marked "O." Thus when the push-button is first pushed into its limit, the lever end 2015 and its arm 2016 are moved into the position O, thereby depressing node 2041 and temporarily closing the switch 2040.

As will be clear from the drawings, micro-switch 2050 is actuated by lever 2051 from push button 2002; and similarly micro-switch 2060 is actuated by lever 2061 from push button 2003. It will further be clear that the depression of any one of the switch actuating levers 2016, 2051 or 2061 will in any case effect closing of micro-switch 2040 through the interposition of pivoted plate 2043, which extends from the top to the bottom of the switch box.

As previously stated, means are provided for interlocking the movements of the three push-buttons so that they will function for initial and subsequent selections by the operator as previously described in connection with the mechanism of Fig. 2. For this purpose push-button 2001 is interlocked with push-button 2003 by means of the U-shaped interconnecting lever 2070 which is centrally pivoted at 2071. One extending end thereof lies in the notch 2072 formed in the shorter arm of lever 2016, while the opposite free end of said lever 2070 lies in a similar notch formed near the end of switch lever 2061. Thus when push-button 2001 is pushed in it will depress the opposite end of lever 2070 and thereby prevent or release lever 2061 from contacting with micro-switch 2060. It will be clear that the pushing in of button 2003 at any stage in the selective cycle will similarly release or prevent push-button 2001 from actuating its switch 2021.

A similar interlocking arrangement is provided for the central push-button 2002. In this case a pair of relatively short levers are provided, each actuated by inward movement of the push-button 2002. One of said levers 2075 is pivotally mounted at 2076 so that its lower end (Fig. 13) is pushed inwardly by inward movement of button 2002 and its upper end 2077 is correspondingly moved out. The upper end 2077 also lies in the notch 2072 of lever 2016 and thereby co-functions with the push button 2001 as will be clear. Similarly, another lever 2078 extends downwardly in the opposite direction from the path of push-button 2002, being pivoted at 2079 and lying in the notched end of switch lever 2061. As will be clear from Fig. 12 the short arm of switch arm 2061 is also suitably notched to receive the free adjacent ends of the two levers 2075 and 2078.

Referring to Fig. 16, the circuits for operating the various units of my apparatus can be readily traced from the switch mechanism hereinbefore described. The interlocking levers 2070, 2075 and 2078 are diagrammatically symbolized in Fig. 16 by the single bar 2080 and the functional relation thereof to mechanical forms of Figs. 12–15 will be clear without further description. No showing is made in Fig. 16 of the syrup supply switches which would normally be provided in conjunction with the circuits for the solenoid 602 and 702. Furthermore, only a single counter mechanism 120 is shown, it being understood that three such counters will preferably be provided and interlocked with the cup dispenser circuit as shown in Fig. 2. The circuits and devices of the timer unit T are identical with those shown and described in connection with Fig. 16.

The invention in its broader aspects is not limited to the specific mechanisms shown and described but departures may be made therefrom within the scope of the accompanying claims without departing from the principles of the invention and without sacrificing its chief advantages.

What I claim is:

1. In a beverage dispensing mechanism in combination supply means for a plurality of fluids, means for dispensing from one or more of said supplies a predetermined total amount of fluid and means for selectively varying the constituent proportions of said total amount of fluid during the dispensing thereof.

2. In a beverage dispensing mechanism in combination supply means for a plurality of flavors, means for dispensing from the machine a drink of predetermined total fluid quantity containing one or more of said flavors, and means for selectively changing the relative proportions of said flavors in said drink during the dispensing thereof.

3. In a beverage dispensing mechanism in combination supply means for a plurality of flavors, means for dispensing from the machine a drink of predetermined total fluid quantity containing one or more of said flavors, and manually operable means for selectively changing the relative proportions of said flavors in said drink during the dispensing thereof.

4. In a beverage dispensing mechanism in combination supply means for a plurality of flavors, timing means for controllably dispensing a drink of fixed volume within a predetermined time period, said drink containing one or more of said flavors, and selective means operable during said period for varying the proportions of the flavors composing said drink.

5. The method of dispensing beverages which includes the steps of dispensing a drink of fixed fluid quantity by delivering liquid from a constant pressure supply through valve means of constant orifice for a fixed period of time and selectively varying the relative portions of the component liquids comprising said drink during the delivery thereof.

6. In a beverage dispensing apparatus in combination supply means for carbonated water, supp'y means for a flavor-fluid and delivery means for a drink mixture of said flavor with carbonated water, said means comprising a flavor-fluid dispensing tube, a tube for simultaneously delivering carbonated water, and means for introducing a portion of the carbonated water into the flavor-fluid tube during the delivery operation.

7. In a beverage dispensing aparatus in combination a tube for delivering syrup, means for simultaneously delivering carbonated water, and means for introducing a portion of said carbonated water into the syrup tube a substantial distance from the delivery end thereof.

8. In a beverage dispensing apparatus in combination a syrup delivery tube, a carbonated water conduit extending along and about said syrup tube, and an opening in said syrup tube remote from the delivery end thereof for the introduction of a portion of the carbonated water from said conduit into said syrup tube.

9. In a beverage dispensing mechanism in combination, supply means for a plurality of flavors and for carbonated water, timing means for controllably dispensing a drink of fixed volume within a predetermined time period, said drink containing carbonated water and one or more of said flavors, selective means operable during said time period for varying the proportions of the flavors composing said drink, and means for dispensing a fixed quantity of carbonated water regardless of the variations of said flavor proportions.

10. In a beverage dispensing mechanism in combination supply means for a plurality of flavors, means for dispensing from the machine a drink of predetermined total fluid quantity containing one or more of said flavors, and means for selectively changing the relative proportions of said flavors in said drink during the dispensing thereof, and means for dispensing a fixed quantity of carbonated water regardless of the changes in proportions of said flavors.

WADE W. BOWMAN.

REFERENCES CITED

The following references are of record in the file of this patent:

UNITED STATES PATENTS

| Number | Name | Date |
|---|---|---|
| 894,459 | Meyer | July 14, 1908 |
| 967,286 | Young | Aug. 16, 1910 |
| 1,176,103 | Sheehan | Mar. 21, 1916 |
| 1,261,986 | White | Apr. 9, 1918 |
| 1,637,808 | Armand | Aug. 2, 1927 |
| 1,737,784 | Cherry | Dec. 3, 1929 |
| 1,820,981 | Le Fever | Sept. 1, 1931 |
| 1,865,773 | Madden | July 5, 1932 |
| 1,912,171 | Austin | May 30, 1933 |
| 1,911,151 | Holsted | May 23, 1933 |
| 1,944,800 | Rogers | Jan. 23, 1934 |
| 2,284,880 | Nicholson | June 2, 1942 |

FOREIGN PATENTS

| Number | Country | Date |
|---|---|---|
| 6,530 | Great Britain | July 5, 1890 |
| 90,935 | Switzerland | Oct. 10, 1921 |